United States Patent
Hußenether et al.

(10) Patent No.: US 11,280,384 B2
(45) Date of Patent: Mar. 22, 2022

(54) BALANCE SHAFT ASSEMBLY

(71) Applicant: Schaeffler Technologies AG & Co. KG, Herzogenaurach (DE)

(72) Inventors: Thomas Hußenether, Nuremberg (DE); Norbert Geyer, Höchstadt (DE); Hannes Schreyer, Gerhardshofen (DE); Christof Faria, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/269,119

(22) PCT Filed: Aug. 29, 2019

(86) PCT No.: PCT/DE2019/100779
§ 371 (c)(1),
(2) Date: Feb. 17, 2021

(87) PCT Pub. No.: WO2020/043241
PCT Pub. Date: Mar. 5, 2020

(65) Prior Publication Data
US 2021/0310540 A1    Oct. 7, 2021

(30) Foreign Application Priority Data

Aug. 30, 2018 (DE) .................... 10 2018 006 884.7
Nov. 16, 2018 (DE) .................... 10 2018 128 830.1
(Continued)

(51) Int. Cl.
*F16F 15/22* (2006.01)
*F16C 3/20* (2006.01)
(Continued)

(52) U.S. Cl.
CPC .............. *F16F 15/267* (2013.01); *F16C 3/20* (2013.01); *F16C 19/463* (2013.01);
(Continued)

(58) Field of Classification Search
CPC .................. F16F 15/264; F16F 15/267; F16F 2230/0011; F16F 2232/02; F16C 3/20;
(Continued)

(56) References Cited

U.S. PATENT DOCUMENTS 5,788,381 A    8/1998  Yamazaki et al.
8,757,888 B2 *  6/2014  Flender ................ F16F 15/267
                                                          384/560
(Continued)

FOREIGN PATENT DOCUMENTS

CN    105276081 A1    1/2016
DE    19926406 A1    12/2000
(Continued)

*Primary Examiner* — Adam D Rogers
(74) *Attorney, Agent, or Firm* — Matthew Evans

(57) ABSTRACT

A balance shaft is proposed that includes: i) an unbalance shaft having an unbalance section and an adjacent bearing pin having a cylindrical partial circumference which is oriented towards the shaft imbalance; ii) a bearing ring which surrounds the bearing pin and bears against the cylindrical partial circumference and delimits a free space with a bearing pin back radially opposite thereto; and, iii) a clamping element which is clamped in the free space and clamps the bearing ring radially against the cylindrical partial circumference. The clamping element is intended to secure the bearing ring against axial sliding on both sides on the bearing pin, and the clamping element is connected in an axially interlocking manner to the unbalance shaft on one side and to the bearing ring on the other side.

19 Claims, 1 Drawing Sheet

(30) Foreign Application Priority Data

Jan. 18, 2019 (DE) ..................... 10 2019 101 319.4
Jan. 18, 2019 (DE) ..................... 10 2019 101 322.4

(51) Int. Cl.
*F16C 35/06* (2006.01)
*F16F 15/26* (2006.01)
*F16C 19/46* (2006.01)
*F16C 35/073* (2006.01)

(52) U.S. Cl.
CPC ........ *F16C 35/073* (2013.01); *F16C 2226/74* (2013.01); *F16F 2230/0011* (2013.01); *F16F 2232/02* (2013.01)

(58) Field of Classification Search
CPC ... F16C 19/463; F16C 35/073; F16C 2226/74
See application file for complete search history.

(56) References Cited

U.S. PATENT DOCUMENTS

| | | | | |
|---|---|---|---|---|
| 8,939,123 | B2 * | 1/2015 | Herzog | F16F 15/267 123/192.2 |
| 10,302,122 | B2 * | 5/2019 | Pichl | F16C 35/073 |
| 2007/0261657 | A1 * | 11/2007 | Marzy | F16C 3/02 123/192.2 |
| 2009/0257702 | A1 * | 10/2009 | Solfrank | F16C 35/063 384/585 |
| 2014/0311280 | A1 * | 10/2014 | Solfrank | F16F 15/22 74/572.2 |
| 2015/0267773 | A1 * | 9/2015 | Corbett | F16F 15/267 123/192.2 |
| 2017/0082172 | A1 * | 3/2017 | Britzger | F16F 15/264 |
| 2021/0164537 | A1 * | 6/2021 | Lee | F16F 15/267 |
| 2021/0317869 | A1 * | 10/2021 | Schreyer | F16C 33/58 |

FOREIGN PATENT DOCUMENTS

| | | | | |
|---|---|---|---|---|
| DE | 69702781 | T2 | 12/2000 | |
| DE | 102008018545 | A1 | 10/2009 | |
| DE | 102011088603 | A1 | 6/2013 | |
| DE | 202013100896 | U1 * | 6/2014 | ........... F16F 15/267 |
| DE | 202013100896 | U1 | 7/2014 | |
| DE | 102016210480 | A1 | 1/2018 | |
| DE | 202017102212 | U1 | 8/2018 | |
| DE | 102018115429 | A1 * | 1/2020 | ........... F16F 15/267 |
| DE | 102019101318 | A1 * | 3/2020 | ........... F16F 15/267 |
| DE | 102019101320 | A1 * | 3/2020 | ............... F16C 3/20 |
| DE | 102019101321 | A1 * | 3/2020 | ............... F16C 3/20 |
| DE | 102019101319 | A1 * | 5/2020 | ........... F16F 15/267 |
| EP | 3043088 | A1 * | 7/2016 | ............. F16C 33/62 |
| EP | 2426374 | B1 | 2/2017 | |
| EP | 2459899 | B1 | 2/2017 | |
| WO | WO-2011012239 | A2 * | 2/2011 | ........... F16C 35/063 |
| WO | 2017207281 | A1 | 12/2017 | |
| WO | 2020098879 | A1 | 5/2020 | |

* cited by examiner

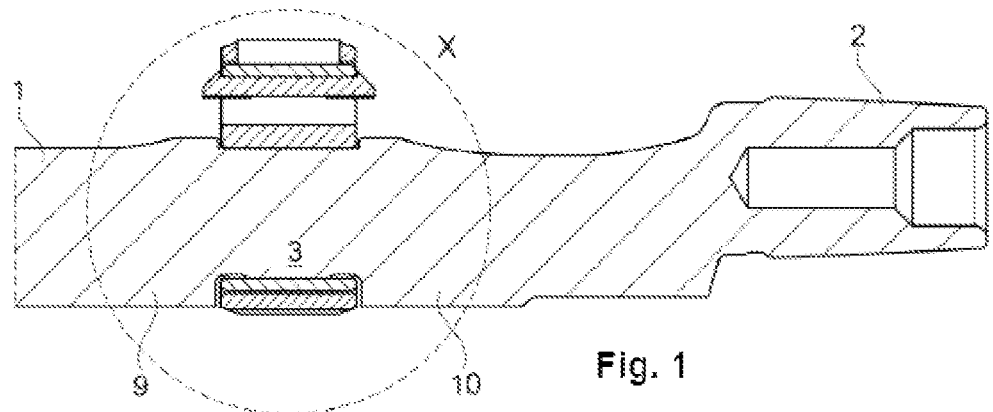
Fig. 1
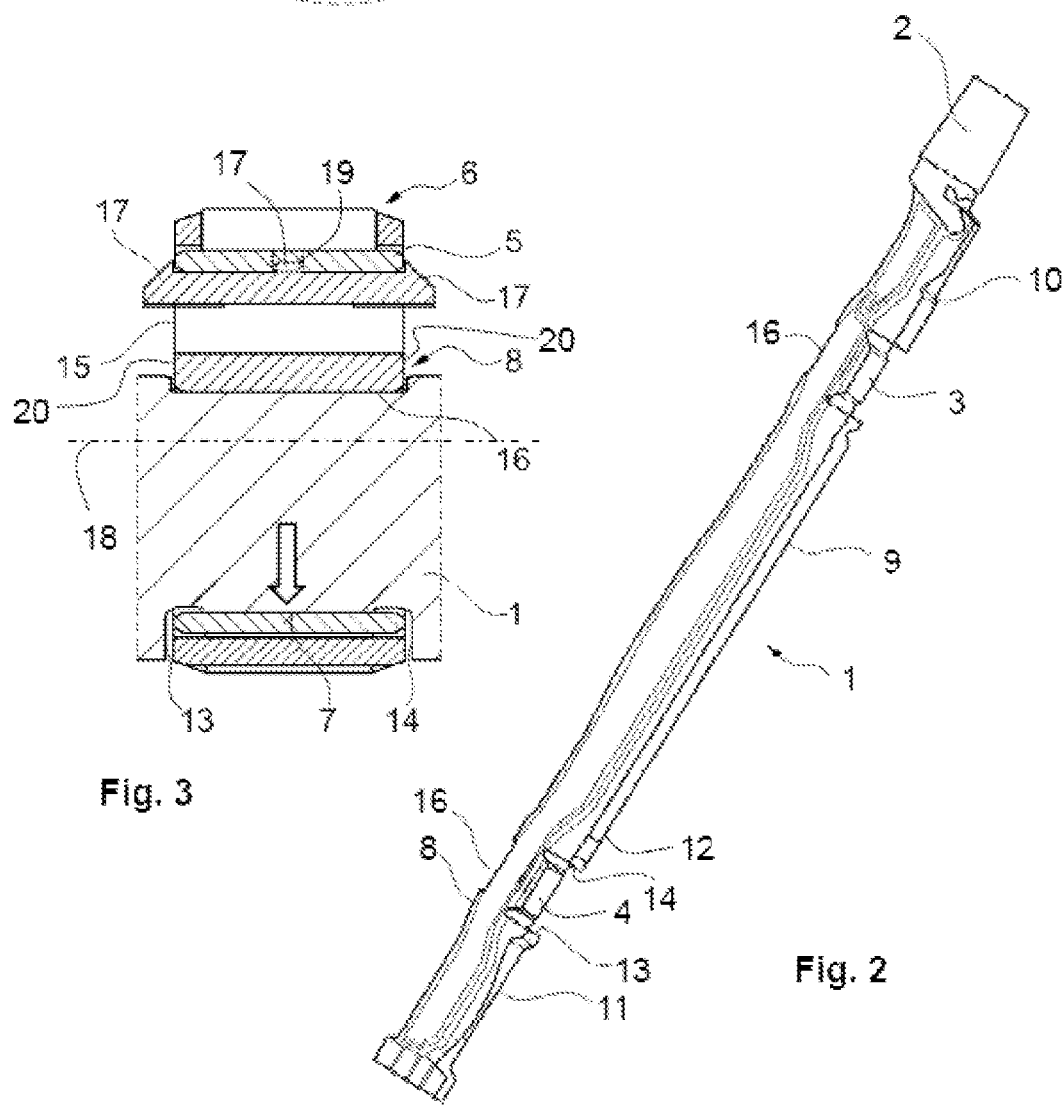
Fig. 3
Fig. 2

BALANCE SHAFT ASSEMBLY

CROSS-REFERENCE TO RELATED APPLICATIONS

This application is the U.S. National Phase of PCT Application No. PCT/DE2019/100779 filed on Aug. 29, 2019 which claims priority to: DE 10 2018 006 884.7 filed on Aug. 30, 2018; DE 10 2018 128 830.1 filed on Nov. 16, 2018; DE 10 2019 101 322.4 filed on Jan. 18, 2019; and, DE 10 2019 101 319.4 filed on Jan. 18, 2019; the entire disclosures of which are incorporated by reference herein.

TECHNICAL FIELD

This disclosure relates to a balance shaft for compensating mass forces and/or mass moments of a reciprocating piston internal combustion engine.

BACKGROUND

A generic balance shaft having an unbalance shaft and a bearing ring, which is fastened to the bearing journal of the unbalance shaft via an elastic clamping element between the bearing ring and the bearing journal back, is known from DE 10 2016 210 480 A1.

A further assembled balance shaft is known, for example, from EP 2 459 899 B1, in which an axially outer edge region of the bearing ring is connected to an axial side surface in the region of the cylindrical partial circumference.

SUMMARY

The object of the present disclosure is to provide an assembled balance shaft with an alternatively joined bearing ring.

The solution of this object is described herein. Accordingly, the clamping element is intended to secure the bearing ring against axial sliding on both sides on the bearing journal, wherein the clamping element is connected in an axially interlocking manner to the unbalance shaft on one side and to the bearing ring on the other side.

In other words, the connection in an axially interlocking manner of the bearing ring to the unbalance shaft is established indirectly, namely via the clamping element.

In an example embodiment, the cylindrical partial circumference and consequently also the inner circumferential surface of the bearing ring can be radially recessed with respect to the adjacent unbalance sections. This makes it possible to increase the ratio of the shaft imbalance to the shaft mass in favor of the shaft's lightweight construction.

The axial interlocking between the clamping element and the unbalance shaft can be formed by a groove in the bearing journal back, wherein the groove walls of the groove axially enclose axial end faces of the clamping element. Conversely, it is possible for the clamping element to have a recess that axially encloses a projection arranged on the bearing journal back.

The axial interlocking between the clamping element and the bearing ring can be formed in that either the bearing ring axially encloses the clamping element or—conversely—the clamping element axially encloses the bearing ring.

Optionally, the bearing ring should be connected to the clamping element in an interlocking manner both axially and in the circumferential direction. The circumferential interlocking can in particular be formed by a radially outward projection on the clamping element, which engages in a transverse bore in the bearing ring and (also) secures it against rotation relative to the clamping element and thus relative to the bearing journal. The projection and the transverse bore are expediently positioned in the load-free circumferential region of the bearing journal.

SUMMARY

Further features of the disclosure result from the following description and from the drawings, in which an exemplary embodiment of a balance shaft according to the disclosure is shown. In the figures:

FIG. 1 shows an end portion of the balance shaft in longitudinal section;

FIG. 2 shows the unbalance shaft according to FIG. 1 as an individual part; and

FIG. 3 shows a detailed view X according to FIG. 1.

DETAILED DESCRIPTION OF EMBODIMENTS

FIGS. 1 to 3 show components and the assembly of a balance shaft according to the disclosure. This comprises an unbalance shaft 1 produced as a cast or forged part with an end drive journal 2 for a drive wheel (not shown) to be mounted thereon and with unbalance sections 9, 10, 11 and 12 and with bearing journals 3 and 4, each of which are respectively connected to two of the unbalance sections 9 to 12. The bearing journals 3, 4 are only partially cylindrical, and their cylindrical partial circumference 7 is oriented to maximize the shaft imbalance (see arrow in FIG. 3) so that the imbalance of the unbalance sections 9 to 12 and the imbalance of the bearing journals 3, 4 are essentially parallel and are oriented in the same direction and load the cylindrical partial circumference 7 essentially in the center of the circumference. The (non-cylindrical) partial circumference of the bearing journal 3, 4, which is radially opposite the cylindrical partial circumference 7, hereinafter referred to as the bearing journal back 8, is cleared in relation to the circumferential circle of the cylindrical partial circumference 7 related to the shaft axis of rotation 18.

The balance shaft further comprises a bearing ring 5 for each bearing journal 3, 4, a clamping element 15 that detachably fastens the bearing ring 5 to the bearing journal 3, 4 (non-destructively) and a needle roller and cage assembly 6 for radial needle bearing of the balance shaft in a housing of an internal combustion engine. The inner track of the needle roller and cage assembly 6 is formed by the bearing ring 5.

The circumferential circle of the cylindrical partial circumference 7 is smaller than the circumferential circle of the adjacent unbalance sections 9 and 10 or 11 and 12, wherein both the cylindrical partial circumference 7 and the inner track on the bearing ring 5 are radially recessed with respect to axial shoulders 13 and 14 of the unbalance sections 9 to 12. The width of each bearing ring 5 is smaller than the mutual spacing of the axial shoulders 13, 14, which each extend with a circumferential angle, in this case, of significantly less than 180° only partially and essentially in a mirror-symmetrical manner to the load zone on the cylindrical partial circumference 7, and which is subjected to point load due to the imbalance of the bearing ring 5 resting thereon. Each bearing ring 5 is fastened between the axial shoulders 13, 14 with approximately the same distance on both sides, see FIG. 3. The bearing rings 5 are assembled by threading them onto the unbalance shaft 1 and then positioning them on the bearing journals 3 or 4.

The imbalance of the unbalance sections 9 to 12 and the imbalance of the bearing journals 3, 4 adjoining same are essentially parallel and oriented in the same direction to maximize the shaft imbalance (see arrow in FIG. 3), wherein each cylindrical partial circumference 7 is aligned so as to be extensively loaded essentially in the center.

The clamping elements 15, which are made of plastic and alternatively of spring-hard sheet metal, have an approximately crescent-shaped cross-section and are inserted under elastic deformation in the radial free space that is delimited by the bearing journal back 8 and the inner circumferential surface of the bearing ring 5. The radial pre-clamping force of the clamping element 15 acts on the bearing ring 5 in the opposite direction to the direction of the shaft unbalance, so that the bearing ring 5 is held in adherent contact with the cylindrical partial circumference 7.

The axial fastening of the bearing rings 5 on the bearing journals 3, 4 takes place (via the static friction caused by the clamping force) via an axial interlocking between the clamping element 15 and the unbalance shaft 1 on one side and between the clamping element 15 and the bearing ring 5 on the other side. Thus, on the one hand, the clamping element 15 is secured against axial sliding on both sides with respect to the unbalance shaft 1, and on the other hand, each bearing ring 5 is secured against axial sliding on both sides with respect to the clamping element 15 and, by means of the clamping element 15, consequently also with respect to the unbalance shaft 1. There is no direct axial interlocking connection between the bearing ring 5 and the unbalance shaft 1.

In the illustrated embodiment, the axial interlocking between the clamping element 15 and the unbalance shaft 1 is formed by a groove 16 made in the bearing journal back 8 with groove walls running transversely to the shaft rotation axis 18, which axially enclose the axial end faces 20 of the clamping element 15 practically free of axial play. The axial interlocking between the clamping element 15 and the bearing ring 5 is formed by radially outward projections 17 on the clamping element 15, which also axially enclose the end faces of the bearing ring 5 practically free of axial play. It could also be stated that each of the radially outward projections 17 of the clamping element 15 serves as an axial stop for each respective end face or axial side of the bearing ring 5.

The term "practically free of axial play" is to be understood either as an enclosure free of axial play or an enclosure subject to axial play, the maximum axial clearance of which is such that an axial run-up of the bearing ring 5 directly on the unbalance shaft 1 is excluded.

The projections 17 are designed as snap hooks with insertion bevels to be able to yield elastically in the radially inward direction when the clamping element 15 is clipped in between the bearing journal back 8 and the bearing ring 5.

In an alternative embodiment, the snap hooks can be supplemented or replaced by a projection 17 indicated by a dotted line in FIG. 3 on the clamping element 15, which engages in a transverse hole 19 in the bearing ring 5 and thus—via the static friction of the bearing ring 5 at the cylindrical partial circumference 7—also secures same in an interlocking manner from twisting against the bearing journal 3, 4. The projection 17' and thus also the transverse bore 19 are positioned to be diametrical to the load zone in the load-free circumferential region of the bearing journal 3, 4.

The invention claimed is:

1. A balance shaft assembly, comprising:
   an unbalance shaft having an unbalance section and a bearing journal arranged adjacent to the unbalance section, the bearing journal having a cylindrical partial circumference oriented towards an imbalance side of the unbalance shaft;
   a bearing ring surrounding the bearing journal and bearing against the cylindrical partial circumference, the bearing ring defining a free space with a bearing journal back, and the bearing journal back arranged radially opposite the cylindrical partial circumference; and
   a clamping element disposed in the free space and configured to clamp the bearing ring radially against the cylindrical partial circumference; and
   the clamping element having a radial projection configured to engage a hole of the bearing ring so that the clamping element axially secures the bearing ring.

2. The balance shaft assembly of claim 1, wherein the hole is arranged transverse to a shaft axis of rotation.

3. The balance shaft assembly of claim 1, wherein the radial projection of the clamping element circumferentially secures the bearing ring.

4. The balance shaft assembly of claim 1, wherein the radial projection is arranged within a circumferential region of the bearing ring arranged radially opposite the cylindrical partial circumference.

5. A balance shaft assembly, comprising:
   an unbalance shaft having an unbalance section and a bearing journal arranged adjacent to the unbalance section, the bearing journal having a cylindrical partial circumference oriented towards an imbalance side of the unbalance shaft;
   a bearing ring surrounding the bearing journal and bearing against the cylindrical partial circumference, the bearing ring defining a free space with a bearing journal back, and the bearing journal back arranged radially opposite the cylindrical partial circumference; and
   a clamping element disposed in the free space and configured to clamp the bearing ring radially against the cylindrical partial circumference; and
   the clamping element configured with an axial stop for each axial side of the bearing ring so as to prevent axial sliding of the bearing ring relative to the bearing journal; and
   wherein the clamping element is connected via an axial interlocking configured between the unbalance shaft and the clamping element.

6. The balance shaft assembly of claim 5, wherein the cylindrical partial circumference is radially recessed with respect to the unbalance section.

7. The balance shaft assembly of claim 6, wherein the axial interlocking between the clamping element and the unbalance shaft is formed by a groove in the bearing journal back, the groove having groove walls configured to enclose axial end faces of the clamping element.

8. The balance shaft of assembly claim 5, wherein each axial stop is formed by a radially outward projection arranged on the clamping element, each of the radially outward projections enclosing one of the end faces of the bearing ring.

9. A balance shaft assembly, comprising:
   an unbalance shaft having an unbalance section and a bearing journal arranged adjacently to the unbalance section, the bearing journal having a cylindrical partial circumference oriented towards an imbalance side of the unbalance shaft;
   a bearing ring surrounding the bearing journal and bearing against the cylindrical partial circumference, the bearing ring defining a free space with a bearing journal back, and the bearing journal back arranged radially opposite the cylindrical partial circumference; and a clamping element disposed in the free space, the clamping element configured to: i) clamp the bearing ring against the cylindrical partial circumference, and ii) axially secure the bearing ring; and movement of the clamping element in both axial directions is limited by at least one radial projection extending from the bearing journal back, the at least one radial projection configured to axially abut with the clamping element.

10. The balance shaft assembly of claim 9, wherein the bearing journal back further comprises a radial groove, and the radial groove forms the at least one radial projection.

11. The balance shaft assembly of claim 10, wherein the at least one radial projection comprises a first and a second radial projection formed by a respective first and second walls of the radial groove, each of the first and second walls enclosing an axial end face of the clamping element.

12. The balance shaft assembly of claim 9, wherein the clamping element further comprises radially outward projections configured to axially secure the bearing ring.

13. The balance shaft assembly of claim 12, wherein the radially outward projections of the clamping element are configured as snap hooks configured to elastically deform in a radially inward direction during installation of the clamping element in the free space.

14. The balance shaft assembly of claim 9, wherein the clamping element further comprises a first elastically deformable projection arranged on a first end of the clamping element and a second elastically deformable projection arranged on a second end of the clamping element.

15. The balance shaft assembly of claim 14, wherein at least one of the first or second elastically deformable projections are configured to deflect radially inward when the clamping element is clipped in between the bearing journal back and the bearing ring.

16. The balance shaft assembly of claim 15, wherein the first and second elastically deformable projections are snap hooks configured to axially enclose each respective axial end of the bearing ring.

17. The balance shaft assembly of claim 15, wherein:
as the clamping element is being clipped in between the bearing journal back and the bearing ring:
in a first orientation of the clamping element, the first elastically deformable projection is configured to deflect radially inward when the first end of the clamping element engages a first axial end of the bearing ring; and
in a second orientation of the clamping element, the second elastically deformable projection is configured to deflect radially inward when the second end of the clamping element engages the first axial end of the bearing ring.

18. The balance shaft assembly of claim 17, wherein:
in the first orientation of the clamping element, the first elastically deformable projection is configured to deflect radially outward when the first axial end of the bearing ring abuts with the second elastically deformable projection; and
in the second orientation of the clamping element, the second elastically deformable projection is configured to deflect radially outward when the first axial end of the bearing ring abuts with the first elastically deformable projection.

19. The balance shaft assembly of claim 18, wherein:
in the first orientation of the clamping element, when the first elastically deformable projection deflects radially outward, the first elastically deformable projection encloses a second axial end of the bearing ring; and
in the second orientation of the clamping element, when the second elastically deformable projection deflects radially outward, the second elastically deformable projection encloses the second axial end of the bearing ring.

* * * * *